UNITED STATES PATENT OFFICE.

NATHAN SULZBERGER, OF NEW YORK, N. Y.

PROCESS OF AROMATIZING FATS AND OILS AND THE PRODUCTS DERIVED FROM THE SAME.

1,140,629.     Specification of Letters Patent.     Patented May 25, 1915.

No Drawing.     Application filed August 9, 1911. Serial No. 643,104.

*To all whom it may concern:*

Be it known that I, NATHAN SULZBERGER, born in New York city, and a citizen of the United States, residing at New York city, in the county and State of New York, have invented new and useful Improvements in Processes of Aromatizing Fats and Oils and the Products Derived from the Same, of which the following is a specification.

I have found that the flavor of fats and oils, which are used in the manufacture, particularly of butterin, butter substitutes in general and similar products can be improved by bringing them in contact for longer or shorter periods of time and at various temperatures with certain food products, particularly also food material of cows and other animals—the milk and fat of which is utilized in making butter and cheese.

For the purpose of more clearly illustrating specifically an example of this invention I cite the following: Cotton seed oil was kept for several hours at about 50 to 60 degrees C. in contact with hay; the hay had been previously dried at about 110 degrees C. The oil freed from the hay was clearly scented with aromatic principles of the hay, with which it has been kept in contact. Other material can be treated in a similar way as the hay; for instance, clover (fresh or dried) mixtures of hay and clover, etc.; the idea being to extract with an oil or fatty substance, as for example cotton seed oil, preferably after same has been deodorized, peanut oil, etc., aromatic principles contained in edible products, particularly also in food material of animals, especially such animals, the milk of which is utilized.

Quantities of ingredients, temperature, time and process may be variously modified by the man skilled in the art of making butterlike preparations and material of a fatty and oily nature used for frying and baking without leaving the scope of this invention. The animal food material may be treated priorly to this extraction in such a way as will increase or improve aromatic principles contained in the same. The flavor and aroma in these products of an oily and fatty nature will in most cases more noticeably appear when such products are brought to higher temperatures when used in baking and frying. By the use of the above specified animal food stuffs the aroma also of butter may be improved particularly also in the seasons of the year when such butter lacks more or less such aroma. Instead of using such food material itself, extracts may also be used prepared from the same imparting similar aroma or flavor to fats and oils as the above referred to edible material.

I claim:

1. Cotton-seed oil flavored with aromatic principles of animal food-stuffs of vegetable origin.

2. Cotton seed oil flavored with aromatic principles of hay and clover.

3. An oil or fat to be used in the manufacture of butter-substitutes, flavored with aromatic principles artificially separated from ordinary food-stuffs of leguminous and graminaceous origin of milk-producing animals.

4. An oil or fatty material artificially flavored with aromatic principles, as such occur in ordinary feeding material of leguminous and graminaceous origin of milk-producing animals.

5. Process for preparing a material of a fatty and oily nature, possessing the flavor and aroma of ordinary feeding material of leguminous and graminaceous origin of milk-producing animals, consisting in extracting with said fatty and oily material such feeding material.

6. Process for preparing cotton seed oil, suitably flavored to be used in the manufacture of butter-substitutes, consisting in extracting aromatic principles of ordinary food-stuffs of leguminous and graminaceous origin of milk-producing animals with such cotton seed oil.

7. An article of manufacture comprising an edible substance of a fatty and oily nature artificially flavored and aromatized with natural aromatic principles of feeding material of vegetable origin of milk producing animals containing such aromatic principles in such quantities and proportions and of such chemical nature, as results by extracting with such edible fatty substance such feeding material.

NATHAN SULZBERGER.

Witnesses:
WM. C. BUETHE,
L. J. LOVERSI.